July 24, 1928.
J. J. HILLERY
ATTACHMENT FOR AUTOMOTIVE VEHICLES
Filed Dec. 22, 1926
1,678,007
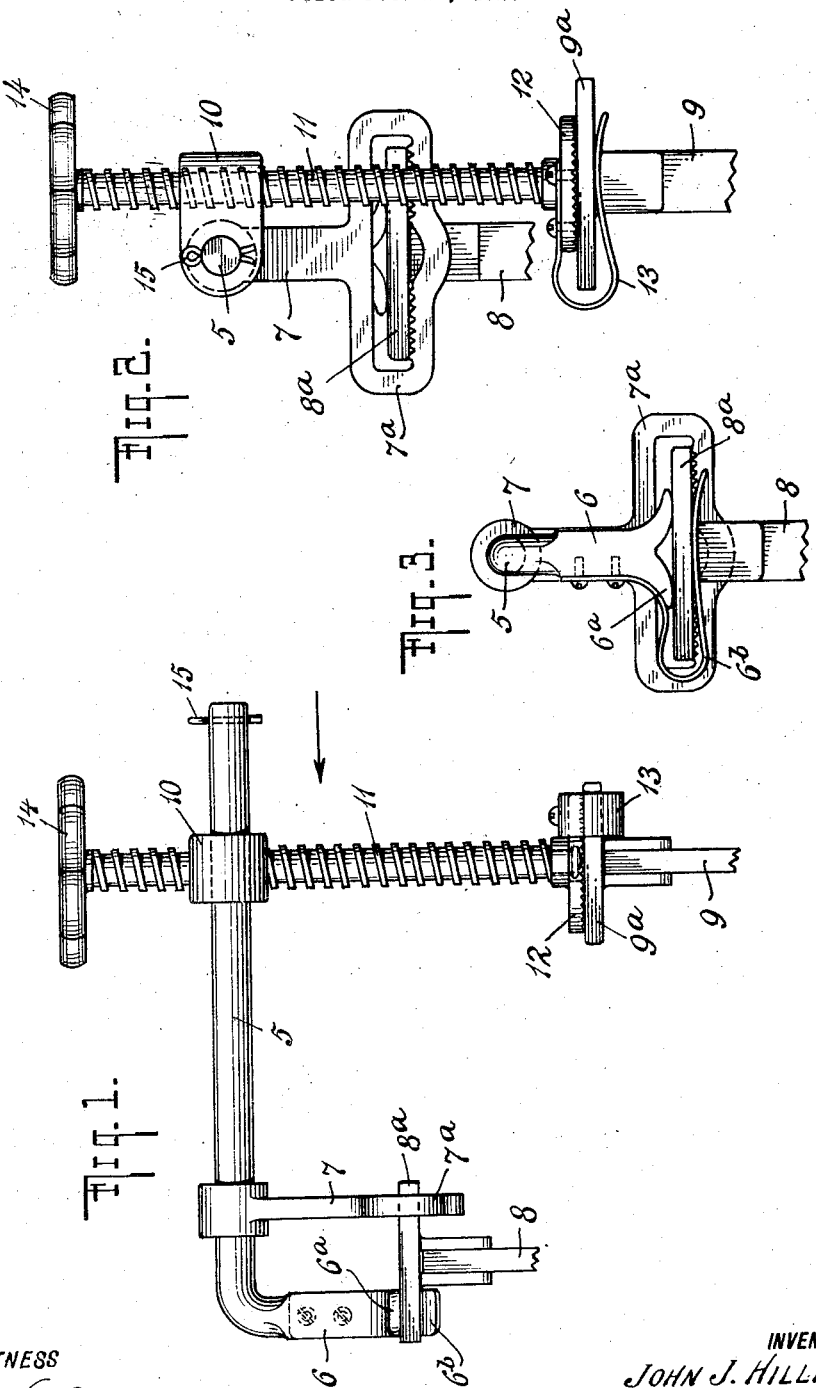
WITNESS
G. V. Rasmussen
INVENTOR
JOHN J. HILLERY
BY
ATTORNEYS Patented July 24, 1928.

1,678,007

UNITED STATES PATENT OFFICE.

JOHN J. HILLERY, OF BOONTON, NEW JERSEY.

ATTACHMENT FOR AUTOMOTIVE VEHICLES.

Application filed December 22, 1926. Serial No. 156,438.

My invention relates to automotive vehicles and more particularly to that type thereof which includes a clutch pedal and a brake pedal. In vehicles of this class it is very often desirable for purposes of adjustment and repair and for other reasons to temporarily fix one or the other of said pedals in a depressed position. The object of the present invention is to provide an attachment in the form of a tool which may be readily placed in and removed from operative positions and whereby the selected pedal may be efficiently fixed in a fully depressed or any intermediate position at will. Other more specific objects will appear from the description hereinafter and the features of novelty will be pointed out in the claims.

In the accompanying drawings which show an example of the invention without defining its limits Fig. 1 is an elevation of the attachment showing it in operative use; Fig. 2 is an end view thereof looking in the direction of the arrow in Fig. 1; and Fig. 3 is an end view looking in the opposite direction with parts omitted for the sake of clearness.

As shown in the illustrated example the attachment or tool comprises a rod or other carrying medium 5 provided with suitable devices 6 and 7 enabling the rod or its equivalent to be detachably fixed upon the pedal 8 which in the illustrated example is the clutch pedal, generally occupying a position to one side of and in relatively close proximity to the brake pedal 9; it will be understood that the device is capable of being similarly attached to the brake pedal 9 if this should become necessary. The device 6 comprises a continuation of the rod 5 extending at right angles thereto and has its free end preferably terminating in oppositely extending lugs 6$^a$ adapted to engage the surface of the foot-rest 8$^a$ of the pedal 8. The device 6 further includes a spring clamp 6$^b$ suitably secured in place by means of rivets or the like and adapted to extend beneath the foot-rest 8$^a$ to clamp the device 6 in position thereon as shown in Figs. 1 and 3. The device 7 is slidably mounted upon the rod 5 so as to depend therefrom as shown in Fig. 1 and at its free end terminates in a yoke 7$^a$ dimensioned to fit over the one edge of the foot-rest 8$^a$ as shown in Figs. 1 and 3. With this arrangement the rod is firmly and securely mounted upon the pedal 8 and is capable of being easily detached therefrom by simply sliding the device 7 to the right in Fig. 1 to remove it from the foot-rest 8$^a$ after which the clamp 6$^b$ is free to be removed from said foot-rest. A block 10 is slidably mounted upon the rod 5 and in addition is capable of rotating thereon and is internally screw-threaded for the accommodation of a threaded stem 11 which at one end is provided with a pressure member 12, adapted to be brought into surface engagement with the foot-rest 9$^a$ of the brake pedal 9 as shown in Figs. 1 and 2. For the purpose of removably fixing the pressure member 12 in place upon the foot-rest 9$^a$ of the brake pedal 9 a spring clamp 13 may be mounted upon the pressure member 12 and extends beneath the foot-rest 9$^a$ in clamping engagement therewith as shown in Fig. 2; to prevent unintentional slipping of the pressure member 12 on the foot-rest 9$^a$ the member 12 may be roughened or provided with teeth on that surface which engages the foot-rest 9$^a$. To facilitate the operation of the device the threaded stem 11 may be provided with a hand wheel 14 or equivalent device as shown in Figs. 1 and 2. Any suitable means may be included in the attachment to prevent the block 10 from being completely removed from the rod 5; as shown in Figs. 1 and 2 this means may comprise a simple cotter-pin 15 extending diametrically through the rod 5.

In explaining the operation of the device, it will be assumed that it is desired to temporarily fix the brake pedal 9 in a depressed position to thereby maintain the brakes in their releasing positions. In such case the rod 5 is fixed upon the clutch pedal 8 by springing the clamping spring 6$^b$ over the foot-rest 8$^a$ with the lugs 6$^a$ in position thereon as shown in Figs. 1 and 3; the device 7 is then adjusted lengthwise of the rod 5 to bring the yoke 7$^a$ over the edge of the foot-rest 8$^a$ to thereby complete the mounting of the rod 5 upon said clutch pedal. The block 10 is then shifted lengthwise of the rod 5 to bring the pressure member 12 into registry with the foot-rest 9$^a$ of the brake pedal 9, said pressure member 12 being clamped in place upon said foot-rest by means of a clamping spring 13. As the stem 11 is now rotated in the proper direction through the medium of the hand wheel 14 it will be obvious that the brake pedal 9 will be depressed to any extent desired up to and including its fully depressed position and will be held in such position as long as desired. When it is desired to restore the brake pedal to its raised position the stem 11 is simply rotated in the reverse direction to relieve the foot-rest 9ª from the restraining action of the pressure member 12 and to thereby permit the brake pedal 9 to resume its normal position.

If for any reason it should be desired to temporarily fix the clutch pedal in a depressed position the attachment would simply be mounted upon the brake pedal 9 in order to make it possible to bring the pressure member 12 into engagement with the foot-rest 8ª of the clutch pedal 8. An operation of the device as hereinbefore described will correspondingly depress the clutch pedal 8 and release the same.

The attachment is useful in many ways in connection with automotive vehicles and is easily attached in place and removed when its services are no longer required. The adjustability of the attachment enables it to be easily utilized in different types of automotive vehicles and adapts it for a variety of relative arrangements of pedals. The attachment itself is simple in construction and requires no skill in its operation.

Various changes in the specific construction shown and described may be made within the scope of the claims without departing from the spirit of my invention.

I claim:

1. An attachment of the kind described comprising a supporting rod, a clamping device at one end of said rod for clamping it upon the pedal of an automotive vehicle, a yoke slidably mounted upon said rod for engagement with said pedal to fix said rod in position thereon, and pressure developing means adjustably carried by said rod for depressing an adjacent pedal of said automotive vehicle.

2. An attachment of the kind described comprising a supporting rod, a clamping device at one end of said rod for clamping it upon the pedal of an automotive vehicle, a yoke slidably mounted upon said rod for engagement with said pedal to fix said rod in position thereon, a block slidably and rotatably mounted on said rod, a threaded stem passing through said block in threaded engagement therewith and a pressure member at one end of said stem for developing a pressure on an adjacent pedal of said automotive vehicle to adjust said last named pedal to a depressed position.

3. An attachment of the kind described comprising a supporting rod, a clamping device at one end of said rod for clamping it upon the pedal of an automotive vehicle, a yoke slidably mounted upon said rod for engagement with said pedal to fix said rod in position thereon, a block slidably and rotatably mounted on said rod, a threaded stem passing through said block in threaded engagement therewith and a pressure member at one end of said stem for developing a pressure on an adjacent pedal of said automotive vehicle to adjust said last named pedal to a depressed position and a clamping spring mounted on said pressure member for clamping it in position on said last named pedal.

In testimony whereof I have hereunto set my hand.

JOHN J. HILLERY.